US008322163B2

(12) United States Patent
Milicevic et al.

(10) Patent No.: US 8,322,163 B2
(45) Date of Patent: Dec. 4, 2012

(54) METHOD AND SYSTEM FOR MANUFACTURING AN OPTICAL FIBER PREFORM

(75) Inventors: Igor Milicevic, Helmond (NL); Mattheus Jacobus Nicolaas Van Stralen, Tilburg (NL); Johannes Antoon Hartsuiker, Eindhoven (NL); Roland Heuvelmans, Eindhoven (NL)

(73) Assignee: Draka Comteq B.V., Amsterdam (NL)

( * ) Notice: Subject to any disclaimer, the term of this patent is extended or adjusted under 35 U.S.C. 154(b) by 290 days.

(21) Appl. No.: 12/689,431

(22) Filed: Jan. 19, 2010

(65) Prior Publication Data
US 2010/0180640 A1  Jul. 22, 2010

(30) Foreign Application Priority Data
Jan. 16, 2009  (NL) ..................................... 2002423

(51) Int. Cl.
*C03B 23/04* (2006.01)
(52) U.S. Cl. ................. 65/377; 65/379; 65/428; 65/419
(58) Field of Classification Search ..................... 65/377, 65/379, 428, 419
See application file for complete search history.

(56) References Cited

U.S. PATENT DOCUMENTS

| 4,317,668 A | * | 3/1982 | Susa et al. ....................... 65/17.2 |
| 4,632,684 A | | 12/1986 | Karbassiyoon et al. |
| 5,325,861 A | * | 7/1994 | Goulding ...................... 600/532 |
| 6,105,396 A | | 8/2000 | Glodis et al. |
| 6,131,413 A | | 10/2000 | Rousseau et al. |
| 6,425,270 B1 | * | 7/2002 | Suzuki et al. ................... 65/379 |
| 6,484,538 B1 | | 11/2002 | Regnier et al. |
| 6,516,636 B1 | * | 2/2003 | Gansicke et al. ............... 65/379 |
| 2003/0115908 A1 | | 6/2003 | Hammerle et al. |

OTHER PUBLICATIONS

Netherlands Search Report for NL 2002423 dated Sep. 2, 2009.
European Search Report for EP 10 15 0878 dated Apr. 23, 2010.
* cited by examiner

*Primary Examiner* — John Hoffmann
(74) *Attorney, Agent, or Firm* — Leydig, Voit & Mayer, Ltd.

(57) ABSTRACT

A method for manufacturing an optical fiber preform is described that includes detecting structural integrity of the tube during a collapsing phase utilizing a fluid flow that is fed to the tube. Also, a system for manufacturing optical fiber preforms is described that comprises a holder configured to hold a tube, a heater configured to heat at least part of the tube to a tube collapsing temperature, and a fluid supply system configured to supply a fluid to the tube held by the holder. The system comprises a tube integrity monitor configured to monitor structural integrity of the tube, during a collapsing phase, by monitoring the fluid.

15 Claims, 3 Drawing Sheets

METHOD AND SYSTEM FOR MANUFACTURING AN OPTICAL FIBER PREFORM

FIELD OF THE INVENTION

The invention relates to a method and system to manufacture an optical fiber preform.

BACKGROUND OF THE INVENTION

One of the steps in production of glass optical fibers is a so called collapse phase. During this phase, a deposited glass tube is contracted in a contraction machine to a glass rod (also known as an optical fiber preform), utilizing a heat source. The contraction machine is generally known as a collapser. The machine has a heat source at a temperature higher than a melting temperature of the deposited glass tubes (above 2000 degrees Celsius). Suitable heat sources for collapsing the glass tubes include hydrogen/oxygen burners, plasma burners, electrical resistance furnaces, and induction furnaces.

Unfortunately, the tube can break during the collapsing process. The broken glass can severely damage the heat source. This will often lead to costly reparation of the heat source as well as the adjustment of the collapse recipe. This causes further process stability problems.

The problem is especially urgent for tubes having deposited layers with relatively high germanium content (e.g., providing a refractive index difference between the substrate tube and the deposited layers higher than 0.5%).

SUMMARY OF THE INVENTION

The present invention provides a solution for the above-mentioned problem. According to the invention, a method for manufacturing an optical fiber preform is characterized by detecting structural integrity of the tube during the tube collapsing phase, utilizing a fluid flow that is fed to the tube.

Thus, any structural degradation of the tube, particularly breakage, can be detected swiftly and reliably. The present method can be implemented without requiring undesirably complex modifications of a collapser system that carries out the method. According to a preferred embodiment, the fluid flow for monitoring tube integrity provides further functionality, for example by physically and/or chemically interacting with the tube. Good results can be obtained by a method that includes varying the pressure of the fluid flowing to the tube according to a predetermined pressure variation pattern and monitoring the pressure variation pattern of the fluid (particularly downstream with respect of the tube).

According to a further preferred embodiment, the method can include moving a heat source along a longitudinal direction of the tube, preferably several times backwards and forwards along the tube, the heat source heating the tube to a softening temperature. For example, the heat source is maintained at a temperature above a softening temperature of the tube for softening the tube, and/or the heat source can locally heat the tube to said softening temperature.

Also, an embodiment of the invention provides a system for manufacturing optical fiber preforms, the system comprising:

a holder configured to hold a tube;

a heater configured to heat at least part of the tube to a tube collapsing temperature; and a fluid supply system configured to supply a fluid to the tube, held by the holder.

The system comprises a tube integrity monitor configured to monitor structural integrity of the tube, during a collapsing phase, by monitoring the fluid. According to a preferred embodiment, the integrity monitor includes a pressure pattern inducer, configured to induce a pressure pattern in the fluid flow.

BRIEF DESCRIPTION OF THE DRAWINGS

The invention will now be further elucidated by means of, non-limiting, examples referring to the drawing, in which.

In the present application, the same or corresponding features are denoted by the same or corresponding reference signs.

DETAILED DESCRIPTION OF THE DRAWINGS

Figure 1:
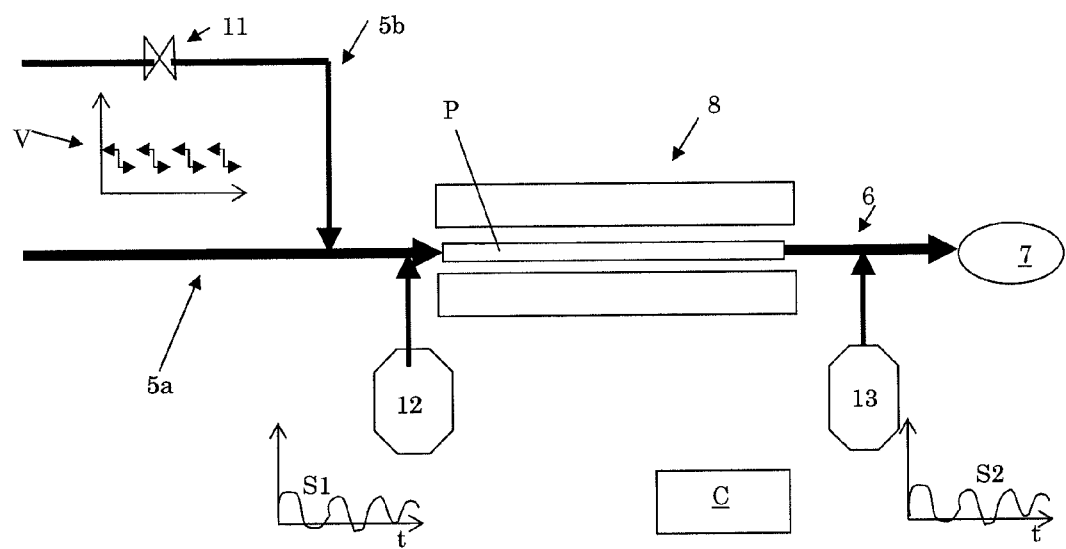
FIG. 1 schematically shows a non-limiting example of a system and method according to the invention.

FIG. 1 depicts a system for collapsing tubes P to manufacture optical fiber preforms. Particularly, the collapsing at least involves a radial shrinking of the tube P to close the tube to a solid rod (called an optical fiber preform).

The tube P for manufacturing the preform, known per se from the prior art, is a cylindrical glass (silica) tube, an inner side of the tube particularly being provided with one or more cladding layers (for example doped and/or undoped silica layers) and one or more core material layers (for example doped silica, particularly Germanium doped silica, the doping increasing the refractive index of the silica). Various dopants, and doping profiles, may be used in the core and cladding layers; generally, the core material will have a higher refractive index than the cladding material. The coated tube as such may be manufactured, for example, using a Chemical Vapor Deposition process, for example PCVD, MCVD, or FCVD, or in a different manner, as will be appreciated by those skilled in the art.

The present system includes a holder 8 configured to hold the preform tube P (in a horizontal orientation), and a heater configured to heat at least part of the tube to a tube collapsing (i.e. softening) temperature. The holder and heater can be configured in various ways. In the drawing, the holder and heater (for example a torch, a furnace) are jointly designated by reference sign 8; they can be jointly called a tube collapser 8. Preferably, the collapser is configured to iteratively move a heat source along a longitudinal direction of the tube P, wherein the heat source is configured to locally heat the tube to a temperature above a softening temperature of the tube.

For example, as will be appreciated by the skilled person, the holder may be configured to rotate the tubular tube P (about a respective centre line), wherein the heater is movable along the tube P to provide local tube collapsing. During operation, substantially the entire tube P can be softened by the heater (iteratively moving there-along), and collapses (without changing a rodlike cylinder-shape).

Preferably, a fluid supply system is provided, to supply a fluid to the tube P. The fluid (for example a fluid of a single substance, or a mixture of different substances) is fed through the tubular tube during the collapsing thereof (i.e. as long as the hollow interior of the tube P is present), particularly to hold the interior at a certain operating pressure, and to prevent moisture entering the tube. The fluid is fed through the tubular tube during at least part of the collapsing phase. Particularly, the fluid can be pure oxygen ($O_2$), or an inert gas. Usually, the fluid has a different composition than fluid present in an environment (usually air) of the tube P.

During operation, the fluid flow is fed through the fiber tube P, and is discharged there-from by an exhaust system 6. A pump 7 is provided (the pump for example being part of the exhaust system) to pump the fluid from the tube P.

During at least part of the process, the fluid may contain an etchant for etching part of the core material. For example, a fluid component for etching the tube can be a fluor-containing substance or Chlorofluorcarbon, for example Hexafluoroethane ($C_2F_6$) or HF. In this way, deposition of impurities can be prevented, and any underdoped outer core layers can be removed, so that a fiber core of high purity, having desired optical properties, can be achieved.

The collapser system advantageously comprises a tube integrity monitor configured to monitor structural integrity of the tube during the collapsing thereof, by monitoring the fluid. To this aim, the present fluid supply system includes a first part 5a to supply a main fluid flow, and a second part 5b for providing a secondary fluid flow. According to an embodiment, the main fluid flow and secondary fluid flow have the same composition. Alternatively, the main fluid flow and secondary fluid flow have different compositions; for example the main fluid flow being or containing a first inert fluid, and the secondary fluid flow being or containing another (second) inert fluid.

The fluid supply includes a pressure pattern inducer 11 configured to induce a predetermined, relatively small and still detectable, pressure pattern (for example a wave-like pressure pattern) in the fluid flow. The pressure pattern inducer 11 has various configurations. In the illustrative example, it is a flow controller, for example a valve, that is part of a second supply system part 5b.

The flow controller 11 is controllable to vary the amount of the secondary fluid that is supplied to the main fluid flow part, leading to a fluctuation of the pressure of the resulting fluid flow. In FIG. 1, a diagram V schematically indicates an example of subsequent flow controller states, the flow controller 11 periodically being set to a first state (for example closed) and a subsequent second state (for example opened) allowing respective lower (first) and higher (second) flow rates of additional fluid that is fed to the main flow.

In a non-limiting example, the first flow rate (when the flow controller 11 is in the first state) is zero. In a further embodiment, the second (high) flow rate of secondary fluid that is fed by the second supply part 5a to the main fluid flow (when the flow controller 11 is in the second state), is at most 1000 sccm (standard cubic centimeters per minute), in a more particular example the fluid flow is at most 100 sccm. Also, in another example, the second flow rate is higher than 1 sccm, for example higher than 10 sccm.

The flow rate of the main flow is at least twice the flow rate of the secondary flow, particularly at least 5 times, and more particularly at least 10 times, the main flow flow rate. For example, the flow rate of the main flow is higher than 200 sccm, for example 2000 sccm, or higher. The flow rate of the main flow may vary during operation.

Alternatively, for example, no secondary fluid flow is available and the main supply part 5a for the main fluid flow is provided with a flow controller to generate the pressure pattern in the fluid.

The pressure pattern, achieved in the fluid flow by the flow controller 11 during operation, can include various different patterns. For example, the pattern can be a fluctuating pressure having a predetermined preferably constant frequency and a predetermined (preferably relatively small) amplitude. Good results are obtained in case a low frequency low amplitude pressure pattern is used. By way of example a pressure pattern is used having a frequency of less than 10 Hz (for example in the range of 0.1-2 Hz, particularly about 1 Hz), and having an amplitude smaller than 100 Pa. More particularly the pressure pattern is about 50 Pa or smaller, for example a pressure variation of about 25 Pa. In yet another example, the pressure pattern amplitude is in the range of about 10-100 Pa.

In the present example, pressure sensors 12, 13 are provided. A first one (pressure sensor 12) is arranged to detect pressure of the fluid upstream with respect to the tube P (held by the holder 8), and a second one (pressure sensor 13) is arranged to detect pressure of the fluid downstream with respect to the tube P. In the drawings, S1 depicts a first sensor signal provided by the first sensor 12, and S2 depicts a second signal provided by the second sensor 13. These sensor signals S1, S2 show the pressure variation, as function of time t, of fluid pressure (in case of a structurally intact tube P). Particularly, each sensor 12, 13 is configured to measure a pressure difference between a fluid (flowing in the supply system 5 to, respectively in the exhaust part 6 from the tube P) and the environment.

In the example, the integrity monitor is configured to monitor the predetermined pressure variation pattern in the fluid mixture. The monitor can include a processing unit, for example data processor, microcontroller, computer, or a similar processing unit, schematically indicated by reference sign C, configured to process sensor signals S1, S2. The processing unit C can be part of a control unit of the tube collapser. The processing unit C is configured to control the pressure pattern inducer 11 to generate the predetermined pressure pattern. The inducer 11 can also operate in a different manner (for example autonomously).

Preferably, the processing unit C is configured to generate an alarm signal in the case where the processing unit C detects certain deviations in the second sensor signal S2 with respect to an expected second sensor signal, the deviations indicating undesired structural degradation of the tube P (such as breakage). Also, optionally, a tube collapsing process can be interrupted automatically by the processing unit C in the case where such degradation is detected.

Figure 3:
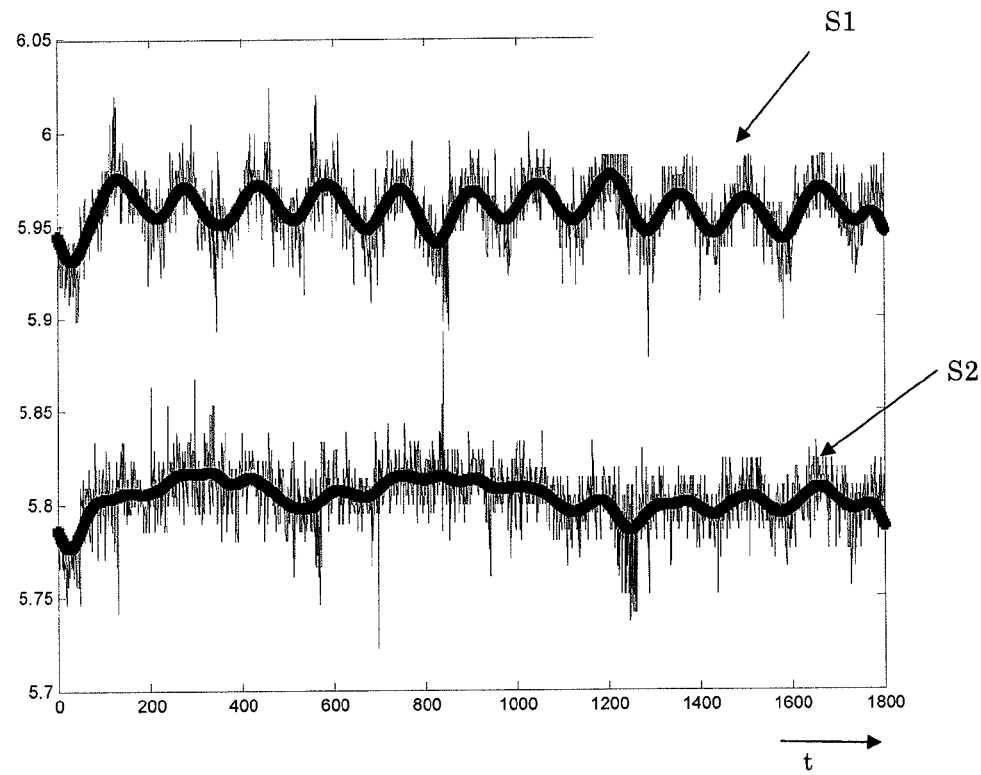
FIG. 3 is a graph showing sensor values in the time domain.

Preferably, the sensor signals S1, S2 are digitally processed. In the case where the sensor signals S1, S2 are analog signals, each sensor signal is sampled, for example, with a relatively low sampling rate (for example lower than 50 Hz, and more particularly lower than 30 Hz). The graph of FIG. 3 shows particular examples of the first and second sensor signal S1, S2, after sampling.

Processing of each signal S1, S2 can include filtering the signals, for example by applying a low-pass filter that preferably has a cut-off frequency about two to five times the frequency of the pressure pattern (e.g., a cut-off frequency lower than 50 Hz, for example about 5 Hz). A sampler to carry out the sampling can be part of the processing unit C, or the sampler and processing unit can be separate components. Also, a filter to carry out the signal filtering can be part of the processing unit C, or they can be separate components.

Figure 4:
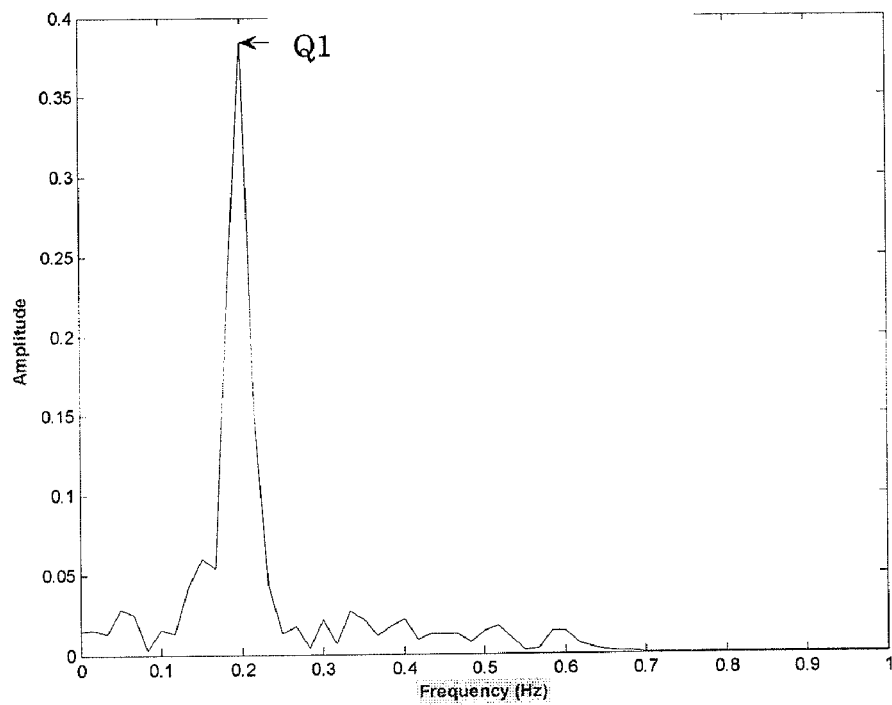
FIG. 4 shows a graph of the first sensor signal in the Frequency domain, before tube breakage.
Figure 5:
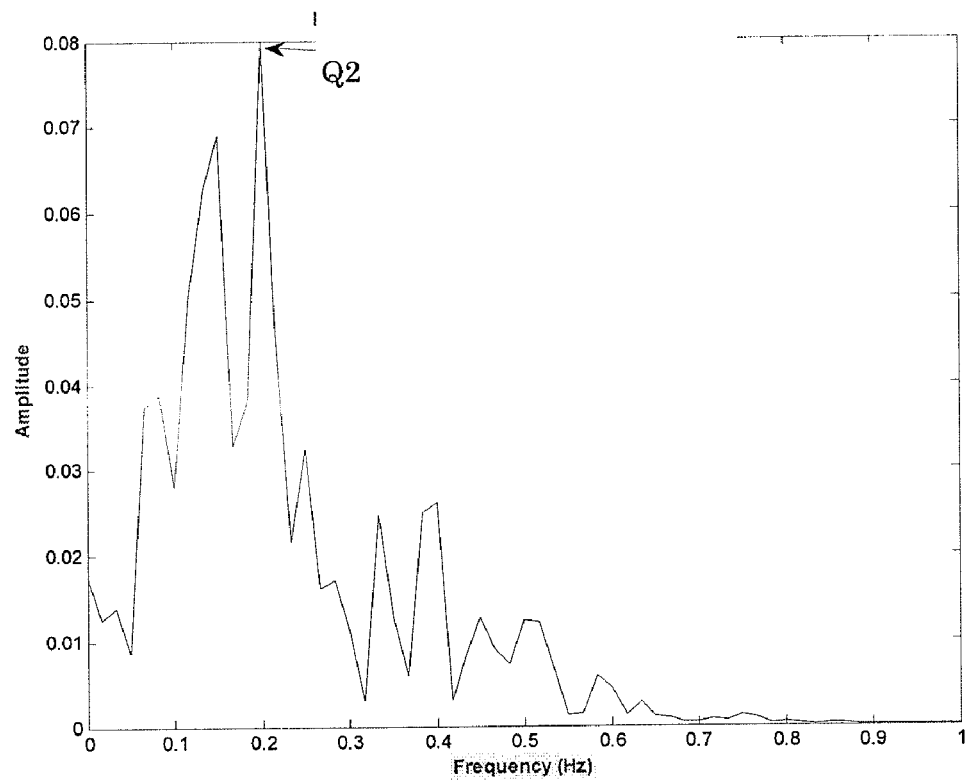
FIG. 5 shows a graph of the second sensor signal in the Frequency domain, before tube breakage.

In the case where the pressure pattern has a substantially constant frequency (for example 0.2 Hz, as follows from the frequency peaks Q1 and Q2 in the graphs of FIGS. 4-5), the processing unit C is configured to continuously seek the frequency component Q2 in the second sensor signal S2, and to generate an alarm signal in the case where a deviation of the frequency part (for example a drop of the respective amplitude) is detected. Preferably, the processing unit C is configured to convert the second sensor signal S2 from time to frequency domain (e.g., by a Fast Fourier Transform, see FIG. 5), to achieve swift and accurate monitoring of the predetermined part of the signal's spectrum. Optionally, the processing unit C is also configured to continuously seek the frequency component Q1 in the first sensor signal S1, for example via converting the signal S1 from time to frequency domain (FIG. 4 shows the first signal S1 in the frequency domain). As an example, the processing unit C may compare both sensor signals S1, S2 with each other, to detect a change of the second signal S2 that could indicate tube breakage.

During operation, the tube is collapsed by the collapser 8. The fluid (particularly a gas or gas mixture) is fed to the collapsing tube P. During at least a first phase of the process, the fluid preferably includes an etchant to carry out an etching process in the tube P.

The fluid is used for monitoring the collapsing tube P. The pressure of the mixture fed into the tube P has a varying pressure pattern (see, the first sensor signal S1) induced by the activity of the flow controller 11. For example, the flow controller 11 can be periodically (for example with a given switching frequency in the range of 0.1-0.5 Hz) switched between an opened and a closed state, to allow or block a relatively small (for example 100 sccm, or smaller) secondary fluid flow.

Downstream with respect to the tube P, the pressure of fluid flowing from the tube P is detected by the respective (second) sensor 13. The respective sensor signal S2 is processed by the processing unit C. More particularly, the processing unit C monitors the signal S2 in the frequency domain, wherein a frequency peak Q2 relating to the fixed pattern frequency (albeit the pattern having a low amplitude) will be clearly discernable (see, FIG. 5).

Figure 2:
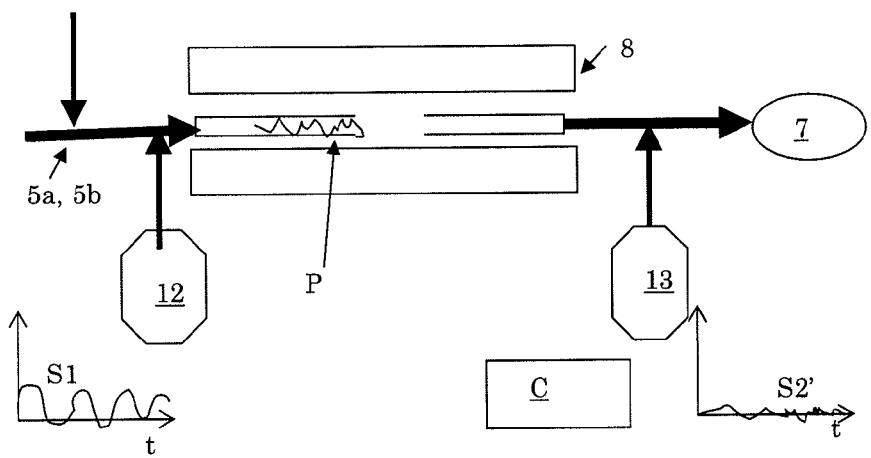
FIG. 2 shows part of the system, after tube breakage.

As follows from FIG. 2, in the case of a tube breakage, a path of the fluid flow (fed to the tube P) will at least partly change. In particular, at least part of the fluid will leak away before reaching the second pressure sensor 13. As a result, a reduction of the pressure pattern's amplitude will occur at the second sensor 13 (see, the respective second sensor signal S2'). A resulting sharp drop in a respective pressure pattern frequency peak Q2 in a respective sensor's frequency domain can then be promptly detected by the processing unit C. The processing unit C then preferably generates an alarm signal (for example to turn on an alarm signaling device, such as a siren and/or warning light), and in a particular embodiment automatically aborts the collapsing process.

Thus, a basic idea of the illustrative embodiments of the invention is to introduce a certain small pressure signal with a certain frequency (for example in the range of 0.5 to 1 Hz, or a different frequency) in the fluid upstream of the tube P. A downstream pressure will vary as well, at the introduced frequency, as long as the collapsing tube P is intact. Monitoring the signal is achieved in a reliable manner, using relatively inexpensive means (e.g., censor circuitry). The invention provides considerable savings in expenses and time, by providing a way to detect a broken tube in the collapser.

In the foregoing specification, the invention has been described with reference to specific examples of embodiments of the invention. It will, however, be evident that various modifications and changes may be made therein without departing from the broader spirit and scope of the invention as set forth in the appended claims.

In the claims, any reference signs placed between parentheses shall not be construed as limiting the claim. The word 'comprising' does not exclude the presence of other features or steps then those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

For example, the method can include application of one or more etching phases, wherein the fluid includes an etchant for etching part of the core material. An afore-mentioned etching phase may be part of an overall tube collapsing phase. An etching phase may involve feeding pure etchant into the tube P, or feeding a mixture comprising oxygen, or an inert gas, and etchant to the tube P.

What is claimed is:

1. A method for manufacturing an optical fiber preform comprising the steps of:
   providing a tube; and
   collapsing the tube during a tube collapsing phase, the tube collapsing phase comprising:
      feeding a fluid to and through the collapsing tube and discharging the fluid from the collapsing tube,
      creating a variation of a pressure of the fluid that is discharged from the collapsing tube by varying a pressure of the fluid that is fed to the collapsing tube,
      monitoring the pressure of the fluid that is discharged from the collapsing tube, the monitoring including detecting the variation of the pressure of the fluid that is discharged from the collapsing tube, and
      detecting structural integrity of the collapsing tube utilizing the variation of the pressure of the fluid that is discharged from the tube.

2. The method according to claim 1, wherein the tube is a cylindrical glass tube, an inner side of the tube being provided with one or more cladding layers and one or more core material layers.

3. The method according to claim 1 wherein the monitoring the pressure of the fluid occurs downstream with respect to the tube.

4. The method according to claim 1, wherein the variation of the pressure has a constant frequency.

5. The method of claim 1 wherein the pressure of the fluid has an amplitude lower than 100 Pa.

6. The method according to claim 1, wherein during at least part of the feeding a fluid step, the fluid contains at least one substance for etching the tube.

7. The method according to claim 1, wherein a path of the fluid flow at least partly changes upon breakage of the tube, wherein the detecting structural integrity comprises detecting the variation of the pressure of the fluid arising from the changes in the path of the fluid flow.

8. The method of claim 1 wherein the method is carried out by a system comprising:
   a holder configured to hold the tube during the collapsing of the tube;
   a heater configured to heat, during the collapsing of the tube, at least part of the tube to a tube collapsing temperature;
   a fluid supply system configured to supply, during the feeding the fluid, the fluid flow to the tube held by the holder; and
   a tube integrity monitor configured to monitor the pressure of the fluid flow discharged from the tube.

9. The method according to claim 8,
   wherein the system includes a pressure pattern inducer that induces the variation of the pressure of the fluid according to a predetermined pressure pattern during the tube collapsing phase.

10. The method according to claim 9, wherein the pressure pattern inducer is part of a fluid supply configured to feed a secondary fluid to a main fluid flow of the fluid to and through the collapsing tube during the tube collapsing phase.

11. The method according to claim 10, wherein the secondary fluid has a flow rate of at most 1000 sccm during the feeding.

12. The method according to claim 10, wherein the secondary fluid has a flow rate of at most 100 sccm during the feeding.

13. The method according to claim 9, wherein the predetermined pressure pattern has a pattern frequency smaller than 10 Hz during the tube collapsing phase.

14. The method according to claim 8, wherein the tube integrity monitor comprises a pressure sensor, and wherein the method comprises, during the detecting step, detecting, by the pressure sensor, pressure of the fluid flow downstream with respect to the tube held by the holder during the tube collapsing phase.

15. The method according to claim 8, wherein, the tube integrity monitor is configured to monitor the pressure of the fluid flow for a predetermined pressure variation pattern during the tube collapsing phase.

* * * * *